United States Patent [19]

Blount

[11] 4,201,702

[45] May 6, 1980

[54] PROCESS TO PRODUCE ALLYL HALIDES COPOLYMERS

[76] Inventor: David H. Blount, 5450 Lea St., San Diego, Calif. 92105

[21] Appl. No.: 870,747

[22] Filed: Jan. 19, 1978

Related U.S. Application Data

[63] Continuation-in-part of Ser. No. 849,853, Nov. 9, 1977, which is a continuation-in-part of Ser. No. 757,239, Jan. 6, 1977, Pat. No. 4,069,391, which is a continuation-in-part of Ser. No. 622,525, Oct. 15, 1975, Pat. No. 4,020,259.

[51] Int. Cl.² .................. C08L 91/00; C08G 63/76; C08C 19/00; C08F 12/18
[52] U.S. Cl. .................. 260/28.5 AS; 525/12; 525/29; 525/330; 525/331; 525/342; 525/360; 526/194; 526/279; 526/291; 526/292; 528/392

[58] Field of Search .................. 526/11.1, 17, 18, 194, 526/72, 29, 47, 279, 291, 292; 260/28.5 AS, 862, 872; 528/392; 525/330, 331, 342, 360, 29, 12

[56] References Cited

U.S. PATENT DOCUMENTS

| 3,299,020 | 1/1967 | Hunter et al. | 526/291 |
|---|---|---|---|
| 3,429,846 | 6/1965 | Bechtold et al. | 526/11.1 |
| 3,959,242 | 5/1976 | Watts et al. | 526/29 |
| 4,115,635 | 9/1978 | Blount | 526/17 |

FOREIGN PATENT DOCUMENTS

590035 of 1947 United Kingdom .................. 526/49

Primary Examiner—Joseph L. Schofer
Assistant Examiner—Herbert J. Lilling

[57] ABSTRACT

Allyl halides will form copolymer with polymerizable unsaturated organic compounds in the presence of an oxidized silicon catalyst.

29 Claims, No Drawings

PROCESS TO PRODUCE ALLYL HALIDES COPOLYMERS

CROSS-REFERENCE TO RELATED APPLICATIONS

This application is a continuation-in-part of my copending application, Ser. No. 849,853 filed Nov. 9, 1977, which is a continuation-in-part of my copending application Ser. No. 757,239, filed Jan. 6, 1977, now U.S. Pat. No. 4,069,391, which is a continuation-in-part of application, Ser. No. 622,525, filed Oct. 15, 1975, now U.S. Pat. No. 4,020,259.

BACKGROUND OF THE INVENTION

This invention relates in general to the process for copolymerizing allyl halides (mono-olefinic allyl type mono-halide) with polymerizable unsaturated organic compounds such as vinyl monomers and diene monomers by utilizing an oxidized silicon catalyst.

The process to polymerize allyl halides in the presence of an oxidized silicon catalyst may be found in U.S. Pat. No. 4,020,259.

Various oxidated silicon compounds such as silicon acids, silica, silicates containing silicon acid radicals and silicates that will react with the halides in the allyl type halides to produce silicon acid radicals of mixtures thereof may be used as the catalyst, and in some cases, react with allyl halides to form allyl type halide silicate polymers.

Various silicon acids such as silicoformic acid, polysilicoformic acid, hydrated silica and natural occuring silicates containing free silicic acid radicals may be used as the catalyst in this invention.

Various alkali metal silicates and alkaline earth metal silicates such as sodium silicate, potassium silicate, lithium silicate, calcium silicate cadmium silicate, barium silicate, zinc silicate, barium silicate, magnesium silicate, aluminum silicate, etc. maybe used as the catalyst in this process.

Some of the natural occuring silicates that maybe used in this invention are clay, kaolin, silica, talc, asbestos, natrolite, garnet, mica, feldspar, beryl, diatomaceous earth, etc., and mixtures thereof. The natural occuring silicates may be treated with a dilute mineral acid to produce more active silicic acid radicals present in the silicates.

Allyl halides may be produced by the addition of a halide to propylene. Methylallyl halides may be produced by the addition of a halide to isobutylene. Other compounds with the combination of —C=C—, which is known as the allylic system, may be used in this invention. Allyl chloride is the preferred allyl halide.

Various mono-olefinic allyl mono-halide with the essential grouping of atoms which may be represented as

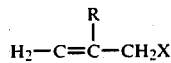

wherein R is a hydrogen or a $C_1$ to $C_4$ alkyl group and wherein X represents a halogen atom. Furthermore, these compounds contain only one olefinic group of which one of the unsaturated carbon atoms contains at least one hydrogen atom per molecule.

Representative examples of mono-olefinic allyl mono-halides are such compounds as allyl chloride, allyl bromide, crotyl chloride, crotyl iodide, beta-methylallyl chloride, beta-methylallyl bromide, methyl vinyl carbinyl chloride, methyl vinyl carbinyl fluoride, alpha-dimethyl-allyl chloride, beta-cyclohexylallyl chloride, cinnamyl chloride, beta-ethylcrotyl chloride, beta-phenyl allyl bromide, alpha-dicyclohexylallyl chloride, beta-propylallyl iodide, beta-phenyl-allyl chloride, beta-cyclohexylallyl fluoride, 2-chloromethyl butene-1, 2-chloromethyl pentene-1, 2-chloromethyl hexene-1 and mixtures thereof.

SUMMARY OF THE INVENTION

I have discovered that an allyl halide compound will polymerize in the presence of an oxidized silicon compound to produce a poly (allyl type halide) polymer. I have discovered that an allyl halide compound and an unsaturated polymerable compound, when mixed in the presence of an oxidized silicon, will produce a copolymer. The polymerization will take place in a wide range of pH, pH of 2 to 12. It will take place with or without water being present.

Other catalysts may be added to the oxidized silicon compounds catalyst to enhance the polymerization such as acid compounds, alkali compounds, Friedel-Crafts catalyst, peroxide type catalyst, redox type peroxide catalyst in aqueous solution and chlorinated silicon acids. These catalysts may be added in the beginning of polymerization or after all the polymerization that will take place with the oxidated silicon catalyst is completed.

Various peroxide type catalyst or initiators such as acetyl benzolyl peroxide, cyclohexanone peroxide, peracetic acid, methyl ethyl ketone peroxide, cyclohexyl hydroperoxide, 2,4-dichlorobenzoyl peroxide, cumene hydroperoxide, tert-butyl hydroperoxide, methyl amyl ketone peroxide, lauroryl peroxide, benzoyl peroxide, tert-butyl perbenzate, di-tert-butyl diperphthalate, p-chlorobenzoyl peroxide, di-tert-butyl peroxide, dibenzal diperoxide, hydrogen peroxide, potassium persulfate, sodium sulfate, ammonium persulfate, persulfuric acid and mixtures thereof may be used as the peroxide in this invention. Commercial activators and promoters may be used in conjunction with the peroxide initiators which are commonly known in the arts. Cobalt, in the form of its ethyl hexoate or naphthenate salt, is a general-purpose activator for use with ketone peroxides and in concentrations as low as 30 ppm will activate a system. Promoters used with acyl peroxides include tertiary dialkyl aryl amines, such as diethyl aniline, and aliphatic thiols, as, for example, lauryl mercaptan. Concentrations used are most often in the range of 0.05 to 0.5 percent of active substance. Persulfates and hydrogen peroxide may be activated by cupric sulfate and ferric sulfate in the amount of 0.005 to 0.45 ppm. Other effective activators are sulfurous acid, sulfites and bisulfites, hydrosulfites, thiosulfates and hydroquinone. The redox system is well known in the art. Water-soluble salts of percarbonic acid, the water soluble salts of perphosphonic acid and the water-soluble salts of sulfoperacid (Aro's acid) may be used. As water-soluble salts, the ammonium, potassium and sodium salts are especially suitable. Mixtures of the catalysts can be employed. Emulsifying agents may be used such as sulfonated methyl oleate, soaps of fatty acid (oleic, myristic, palmitic), ordinary soap, salts of higher fatty alcohol sulfates, salts of aromatic sulfonic acids, higher molecular weight quaternary ammonium salts and mixtures thereof.

Polymerization regulators or modifier such as mercaptans, other organic sulfur compounds and chlorinated hydrocarbons maybe used in this invention.

The oxidated silicon catalyst combined with an acid compound such as sulfuric acid, hydrochloric acid, phosphoric acid maybe used as the catalyst in the copolymerization of allyl halide with terpene compounds, acrylic acid compounds, propylene, furfural, furfuryl alcohol, cyclic unsaturated compounds, epihalohydrin compounds, epoxy compounds, acrylonitrile, styrene, methacrylonitrile and mixtures thereof.

The oxidated silicon catalyst, combined with an alkali compound sodium carbonate, sodium hydroxide, potassium carbonate, potassium hydroxide, lithium hydroxide, calcium hydroxide, alkali metal oxides, sodium cyanide, potassium cyanide, sodium polysulfite, potassium poly-sulfite, ammonia, amine compounds and mixtures thereof may be used in the copolymerization of allyl halides with acrylic acid compounds, ethylene oxide, propylene oxide, epichlorohydrin compounds, polyisocyanate compounds and prepolymers and mixtures thereof.

Fine granular hydrated silica is the preferred oxidized silicon catalyst. The silicoformic acid may be produced by the methods outlined in U.S. Pat. No. 3,674,430. Hydrated silica may be produced by any of the commonly known methods in the art.

The silicon acids may be reacted with silicon tetrahalides to produce a mixture of halosilicon acids. The halosilicon acids are produced by mixing 1 part by weight of a dry, fine, granular silicon acid with about 1 to 2 parts by weight of a silicon tetrahalide, then agitating the mixture for 1 to 4 hours, and the chemical reaction is complete in 6 to 12 hours, thereby producing a white, fine, granular mixture of halosilicon acids. Hydrated silica is the preferred silicon acid and silicon tetrahalide The said halosilicon acid may be used as the catalyst in this invention or added to the silicon acid catalyst. It may be used in the copolymerization of allyl halides with acrylic acid compounds, e.g., acrylic acid hydracrylic acid, methacrylic acid, ethyl acrylic acid, crotonic acid, chloroacrylic acid, fluoroacrylic acid, cyclohexyl methacrylic acid, isobutyl methacrylic acid, bromoacrylic acid benzyl acrylic acid, acrylate compounds, e.g., methyl methacrylate, propyl acrylate, butyl acrylate, pentadecyl acrylate, hexadecyl acrylate, benzyl acrylate, cyclohexyl acrylate, phenyl ethyl acrylate, ethyl methacrylate, methyl alpha-chloroacrylate; 2-chloroethyl acrylate; 1,1-dihydroperfluorobutyl acrylate, lauryl acrylate, cyclohexyl-cyclohexyl methacrylate, allyl methacrylate; ethylene methacrylate, butyl methacrylate, polyethylene glycol dimethacrylate tetraethylene glycol dimethacrylate and mixtures thereof, methyl styrene, styrene, n-vinyl-2-pyrrolidone, vinyl acetate, methyl alkenes, vinyl alkyl ethers, allyl vinyl ethers, alicyclic ethers, aryl alkyl vinyl ethers, aryl vinyl ethers, vinylidene, vinyl chloride, vinyl toluenes, divinyl benzenes, butadiene, isobutylene, butylene, isoprene, chloroprene, and other olefins, consisting of a $C_4$ to $C_7$ isoolefin and a $C_4$ to $C_{10}$ multiolefin, and mixtures thereof, epihalohydrin, epoxy compounds, n-vinyl carbazole, 2-vinyl pyridine, 4-vinyl pyridine and mixtures thereof. The silicon acid may be mixed with a Friedel-Crafts catalysts, e.g. boron trifluoride, anhydrous aluminum, stannic chloride, boron trifluoride, aluminum bromide and other aluminum halides. Friedel-Crafts catalyst are well known in the art and are described in Organic Chemistry, Fieser and Fieser (1956), page 535 to 540, which are incorporated herein by reference, and used in this invention when polymerizing allyl halides with monomers such as isobutylene, methyl alkenes, alpha-methyl styrene, vinyl iso-alkyl ether, terpenes, isoprene and mixtures thereof. The Friedel-Crafts catalyst will generally be used in the amounts ranging from 1 to 25 parts per 100 parts of allyl halides.

The oxidized silicon catalyst may be utilized with a peroxide type catalyst either in a mass type polymerization, in a solution type polymerization or in an aqueous emulsion or suspension type polymerization. A redox type peroxide may be used in the polymerization process. The peroxide type catalyst with the oxidized silicon catalyst maybe used when polymerizing allyl halides with aliphatic dienes, aliphatic vinyl and vinylidene compounds, vinyl chloride, vinyl acetate, aliphatic allyl compound, styrene, heterocyclic viny compounds, ethylene, propylene, tetrafluoroethylene, chlorotrifluoroethylene, unsaturated polyesters, polymers, di-2-alkenyl maleate, and mixtures thereof.

The allyl halides may be chemically reacted with unsaturated polyester resin and unsaturated ester compounds. The unsaturated polyester resins and unsaturated esters compounds may be produced by any of the commonly known methods in the art. They may be produced by reacting an unsaturated dibasic acid such as itaconic, maleic anhydride, fumeric acid, etc. with a saturated glycol or reacting a saturated dibasic acid with unsaturated glycol. Unsaturated ester compounds such as diethylene glycol (bis allyl carbonate), diallyl maleate, diallyl fumarate, diallyl benzene phosphate, diallyl phthalate, triallyl cyanurate, diallyl succinate and mixtures thereof may be reacted with allyl halides to produce allyl halide polyester copolymers.

The preferred method to react allyl halides with polymerizable unsaturated organic compound is to mix about 1 part by weight of an oxidated silicon catalyst with 1 to 3 parts by weight of an allyl halide and 0.1 to 5 parts by weight of a polymerizable unsaturated organic compound then agitate the mixture for about 1 hour at a temperature at which the unsaturated organic compound is in the liquid form and to just below the boiling temperature of the reactants and at ambient to 50 psig. The pH may vary from 2 to 12 depending on the pH at which the unsaturated organic compounds are best polymerized. A copolymer is produced, varing from a thick liquid to a soft solid. The copolymer is then further reacted with another catalyst to produce a hard, solid copolymer. The useful catalyst are peroxide type catalyst, Friedel-Crafts catalyst and halogenated silicon acids.

In an alternate method both catalyst may be added at the same time with the allyl halide and unsaturated organic compound.

In another alternate method wherein an alkali compound is added to allyl halide or poly (allyl type halide) polymer and it reacts chemically with the halide to produce a poly (allyl allyl alcohol) polymer and is then reacted chemically with the unsaturated organic compound.

The oxidated silicon compound may be separated from the copolymer by utilizing a solvent then filtering off the copolymer; the oxidated silicon compound may be filtered from an emulsion of the copolymer; the oxidated silicon compound is usually soluble in alkali metal hydroxides and may be filtered from the copolymer; or the oxidated silicon compound may be left in the copolymer and utilized as a fill. Also, by using heat and an alkali catalyst, the silicon acids will react chemically with copolymer.

The reactions of this invention may take place under any suitable physical conditions. While many of the reactions will take place acceptably at ambient temperature and pressure; in some cases, better results may be obtained at somewhat elevated temperature and pressures, but in other cases, better results may be obtained at somewhat lower temperature in order for the reactants to be in a liquid state. Preferably the reaction takes place in a temperature at which the reactants are in a liquid state. It may be desirable to cool the reaction vessel where the reaction is exothermic. The reaction time to produce the copolymers of this invention is quite varied, ranging from 1 to 12 hours. The reaction time is shortened by an elevated temperature elevated pressure and an increase in the amount of catalyst used. The reaction time may be lengthened where desirable.

The copolymer produced by instant invention may be used as coating agents, filaments, fibers, impregnating wood and like material, adhesive for wood paper, etc, may be molded into useful products such as rods, sheets, blocks, etc., may be used as plastecizers for resins, and other plastic materials and may be used for fireproofing in resins, etc.

It is accordingly, an object of my invention to provide new copolymers. A further object is to provide new copolymers which may be used as molding powder. A further object is to provide new copolymer which may be used as adhesives. A further object is to provide a process for preparing such polymers.

My invention will be illustrated in greater detail by the specific examples that follow, it being understood that those preferred embodiments are illustrative of, but not limited to, procedures which may be used in the production of allyl halide copolymers. Parts and percentages are by weight unless otherwise indicated.

EXAMPLE I

About 1 part by weight of fine granular hydrated silica, 3 parts by weight of 3-chloropropene and 1 part by weight of styrene are mixed. The mixture is then heated to just below the boiling temperature of 3-chloropropene while agitating for 1 hour. The chemical reaction is complete in 1 to 12 hours, thereby producing a light yellow, soft solid poly (3-chloropropene styrene) copolymer.

The copolymer is soluble in common organic solvents such as acetone, acetic acid, aliphatic chlorides, etc. The resin is thermoplastic. It may be used as an adhesive, as protective coating for wood, and may be molded into useful product. The copolymer may be removed from the hydrated silica by use of a solvent, by adding water and it floats to the top; also by adding an alkali hydroxide solution and the hydrated silica goes into solution and then decanted off.

EXAMPLE II

About 1 part by weight of fine granular hydrated silica, 2 parts by weight of methallyl chloride and 1 part by weight of styrene are mixed, then 0.1 part by weight of concentrated sulfuric acid is added while agitating at ambient temperature and pressure. The mixture is agitated for about 1 hour and the reaction is complete in 1 to 12 hours, thereby producing a light yellow, soft, solid, poly (methallyl chloride styrene) copolymer.

EXAMPLE III

About 10 parts by weight of fine granular silicoformic acid, 10 parts by weight of methallyl chloride, 30 parts by weight of water, 0.5 parts by weight of sodium carbonate and 30 parts by weight of styrene are mixed then heated to just below the boiling temperature of methallyl chloride while agitating for about 1 hour, thereby producing a mixture of a soft, sticky, light yellow poly (methallyl chloride styrene) copolymer, styrene and methallyl chloride in an emulsion.

About 0.1 part by weight of potassium persulfate and 0.01 part by weight of cupric sulfate, 1 to 3% by weight of soap, percentage based on total weight of reactants, and water are added to the said mixture then agitated for 1 to 12 hours, thereby producing an emulsion of poly (methallyl chloride styrene) copolymer.

EXAMPLE IV

About 2 parts by weight of a dry, fine, granular hydrated silica and 2 parts by weight of silicon tetrachloride are mixed then agitated while keeping the temperature below the boiling temperature of silicon tetrachloride for 1 to 4 hours. Hydrogen chloride is given off, thereby producing a white, fine granular mixture of chlorosilicon acids. About 8 parts by weight of allyl chloride and 2 parts by weight of styrene and the said chlorosilicon acids are mixed then agitated at ambient temperature and pressure for about 1 hour. The chemical reaction is complete in 1 to 12 hours, thereby producing poly (allyl chloride styrene) copolymers The copolymer is soluble in acetone, allyl chloride, etc., and may be filtered from the halosilicon acids. The copolymer with the chlorosilicon acid may be softened with heat and molded into useful objects such as knobs, toys, buttons, etc. The solution of the copolymer may be used as a protective coating on wood.

EXAMPLE V

About 1 part by weight of fine granular sodium silicate pentahydrate, 3 parts by weight of 3-chloropropene and 1 part by weight of acrylic acid are mixed then agitated at ambient temperature and pressure for 1 hour, thereby producing a poly (3-chloropropene acrylic acid) copolymer. The copolymer is soluble in 3-chloropropene and may be recovered by filteration. Water in the amount of 15 parts by weight are added then heated to just below the boiling point of the reactants for 20 to 60 minutes while agitating, then a dilute mineral acid, hydrochloric acid, is added until the pH is about 6 to 7, thereby coagulating the cream colored, elastic, poly (3-chloropropene allyl alcohol acrylic acid) copolymer. The copolymer may be extracted from the silicic acid by a solvent such as acetic acid and used as an adhesive.

EXAMPLE VI

About 1 part by weight of fine granular magnesium silicate, 2 parts by weight of allyl chloride and 1 part by weight of methacrylic acid are mixed then heated to just below the boiling temperature of allyl chloride while agitating for about 1 hour, thereby producing a soft, sticky, poly (allyl chloride methacrylic acid) copolymer. About 0.25 parts by weight of the chlorosilicon acids as produced in Example IV are added then agitated for about 1 hour. The chemical reaction is complete in 1 to 12 hours, thereby producing a solid poly (allyl chloride methacrylic acid) copolymer.

The copolymer may be molded into useful objects such as tubes, rods, etc., used as an adhesive and used as a protective coating on wood.

EXAMPLE VII

About 10 parts by weight of fine granular hydrated silica, 30 parts by weight of methallyl chloride and 10 parts by weight of methyl methacrylate are mixed then agitated at a temperature between ambient and the boiling temperature of methallyl chloride and at ambient pressure for about 1 hour; the chemical reaction is complete in 1 to 12 hours, thereby producing a soft, poly (methallyl chloride methyl methacrylate) copolymer.

After about 1 hour of agitating the mixture, about 0.1 part by weight of potassium persulfate and 0.01 part by weight of ferric sulfate are added with 8 parts by weight of water containing 0.5 part by weight of sodium carbonate and 0.1 part by weight of soap then agitated for about 1 to 12 hours, thereby producing an emulsion of poly (methallyl chloride methy methacrylate) copolymer.

The copolymer emulsion with the fine granular hydrated silica may be used as a protective coating on wood. The copolymer may be coagulated from the emulsion by addition of a dilute acid compound until the pH is about 5 to 6. The copolymer may be molded into useful objects such as bathtubs using the oxidated silicon compound as a filler.

EXAMPLE VIII

About 10 parts by weight of fine granular hydrated silica, 20 parts by weight of methallyl chloride and 20 parts by weight of acrylonitrile are mixed then heated to just below the boiling temperature of the reactants while agitating for about 1 hour, thereby producing a mixture of poly (methallyl chloride acrylonitrile) copolymer, a thick liquid, methallyl chloride and acrylonitrile.

About 100 parts by weight of water, 0.1 part by weight of potassium persulfate and 0.01 part by weight of cupric sulfate are added to the said mixture then agitated for 1 to 12 hours, thereby producing a white, solid poly (methallyl chloride acrylonitrile) copolymer.

The copolymer is soluble in one or more of the organic solvents such as ethylene carbonate, N-methyl pyrrolidine, acetonitrile, two parts acetonitrile and 1 part dimethyl formamide, dimethyl acetamide, dimethyl formamide, gamma-butyolactone, gamma-vateroacetone, or mixtures thereof. The solution of the copolymer may be used to produce filaments by the dry or wet spinning method and may be used as a coating agent. The copolymer can also be molded into shaped objects.

EXAMPLE IX

About 10 parts by weight of fine granular hydrated silica and 2 parts by weight of allyl chloride are mixed at ambient temperature and pressure then agitated for 10 to 20 minutes. About 20 parts by weight of allyl chloride is slowly added to the mixture and agitated for about 1 hour, thereby producing a thick, light yellow, sticky, poly (allyl chloride) polymer and allyl chloride. About 80 parts by weight of acrylonitrile, 0.2 part by weight of potassium persulfate, 0.02 parts by weight of ferric sulfate, 0.5 part by weight soap, and 200 parts by weight of water are added to the poly (allyl chloride) polymer and allyl chloride mixture. The mixture is then agitated at a temperature between ambient and the boiling temperature of the reactants for 1 to 12 hours, thereby producing a solid, white, poly (allyl halide acrylonitrile) copolymer.

EXAMPLE X

About 1 part by weight of a dry fine granular hydrated silica and 0.25 parts by weight of silicon tetrachloride are mixed then agitated for about 1 to 4 hours, thereby producing a mixture of chlorinated silicon acids and hydrated silica. 3 parts by weight of allyl chloride are added to the mixture then agitated for about 10 to 60 minutes, thereby producing poly (allyl chloride) polymer.

EXAMPLE XI

About 10 parts by weight of fine granular silica, 2.5 parts by weight of sodium hydroxide flakes and 2 parts by weight of water are mixed then heated at 90 degrees to 100 degrees C. until the water evaporates, thereby producing an activated silica. 30 parts by weight of allyl chloride, 3 parts by weight of acrylonitrile, 12 parts by weight of water and 0.2 parts by weight of potassium persulfate are mixed then agitated at a temperature just below the boiling temperature of the reactants at ambient pressure for 1 to 12 hours, thereby producing a white, solid poly (allyl chloride allyl alcohol acrylonitrile) copolymer.

EXAMPLE XII

About 1 part by weight of a fine granular hydrated silica, 2 parts by weight of allyl chloride, 4 parts by weight of styrene and 0.1 parts by weight of concentrated sulfuric acid are mixed then agitated at ambient temperature and pressure for 1 to 12 hours, thereby producing poly (allyl) chloride styrene) copolymer, a light yellow, solid, copolymer. The copolymer is then washed with a dilute alkali solution, sodium carbonate, to remove the sulfuric acid, then filtered to recover the copolymer.

The copolymer is soluble in organic solvents such as acetone, chlorinated hydrocarbons, etc., and the solution may be used as a protective coating on wood. The copolymer may be molded into useful objects such as knobs, toys, handles, etc., by heat and pressure, and the hydrated silica may be used as a filler.

EXAMPLE XIII

About 1 part by weight of a fine granular hydrated silica, 3 parts by weight of methallyl chloride and 0.5 part by weight of styrene are mixed then heated to the boiling temperature of methyallyl chloride while agitating at ambient temperature and pressure for 1 to 12 hours, thereby producing a soft, light yellow, solid poly (allyl chloride styrene) copolymer.

The copolymer is soluble in organic solvents such as acetone and may be used as an adhesive on wood.

EXAMPLE XIV

About 10 parts by weight of magnesium silicate, 20 parts by weight of allyl bromide, 60 parts by weight styrene monomer, 150 parts by weight of water, 0.2 part by weight sodium persulfate, 0.01 part by weight of cupric sulfate, 0.1 part by weight of sodium carbonate and 0.2 parts by weight of sulfonated methyl oleate are mixed then agitated at a temperature just below the boiling temperature of allyl bromide and styrene monomer for 1 to 12 hours, thereby producing a solid poly (allyl bromide styrene) copolymer. The copolymer is soluble in common organic solvents and may be filtered from the magnesium silicate and recovered by evaporating the solvent.

EXAMPLE XV

About 1 part by weight of the mixture of hydrated silica and chlorinated silicon acids as produced in Example 10, 3 parts by weight of allyl chloride and 1 part by weight of styrene are mixed then agitated at ambient temperature and pressure for 1 to 12 hours, thereby producing poly (allyl chloride styrene) copolymer.

The copolymer may be washed with water to remove any hydrogen chloride then molded into useful products. The chlorinated silicon acids may be used as a filler.

EXAMPLE XVI

About 1 part by weight of a fine granular hydrated silica, 2 parts by weight of allyl chloride, 2 parts by weight of alpha-methylstyrene and 0.1 part by weight of anhydrous aluminium chloride are mixed then agitated at ambient temperature and pressure for 1 to 12 hours, thereby producing a solid poly (allyl chloride alpha-methylstyrene) copolymer. The copolymer is soluble in common organic solvents such as allyl chloride and may be filtered from the hydrated silica. The solvent is evaporated, thereby recovering the copolymer. It may be used as an extender in polyurethane foams and may be used in paints and varnishes.

EXAMPLE XVII

About 1 part by weight of a mixture of hydrated silica and chlorinated silicon acids as produced in Example X, 2 parts by weight of methallyl chloride and 4 parts by weight of alpha-methylstyrene are mixed then agitated at ambient temperature and pressure for 1 to 12 hours, thereby producing poly (methallyl chloride alpha-methylstyrene) copolymer.

EXAMPLE XVIII

About 10 parts by weight of fine granular hydrated silica, 20 parts by weight of allyl chloride, 50 parts by weight of water and a redox system, using 0.05 part by weight of dodecyl mercaptan, 0.02 part by weight of ferric sulfate, 0.03 part by weight of potassium persulfate, 0.5 part by weight of anhydrous soap, 0.01 parts by weight of hydroquinone, and 0.1 part by weight of phenyl beta-naphthylamine are mixed; then about 10 parts by weight of vinyl chloride are slowly added while agitating at ambient temperature and pressure in a closed system for 1 to 12 hours, thereby producing an emulsion of poly (allyl chloride vinyl chloride) polymer. The emulsion may be diluted with water then filtered to remove the hydrated silica. The emulsion may be used as a protective coating on wood, walls, etc. Plasterizer and stabilizer may be added to the emulsion.

EXAMPLE XIX

About 1 part by weight of fine granular hydrated silica, 2 parts by weight of methallyl chloride and 2 parts by weight of vinyl chloride are mixed then agitated at a temperature just below the boiling temperature of the reactants for about 1 hour, thereby producing a mixture of poly (methallyl chloride vinyl chloride) copolymer, methallyl chloride and vinyl chloride. About 0.005 part by weight of an aryl peroxide are added then agitated for 1 to 12 hours in a closed system, thereby producing a solid poly (allyl chloride vinyl chloride) copolymer. The copolymer may be molded into useful product such as tube, handles, etc., by heat and pressure. The hydrated silica may be used as a filler.

EXAMPLE XX

About 10 parts by weight of fine granular hydrated silica, 20 parts by weight of allyl chloride and 10 parts by weight of vinylidene chloride are mixed then agitated in a closed system at a temperature just below the boiling temperature of the reactants for about 1 hour. A redox system, using 60 parts by weight of water, 0.4 part by weight of potassium fatty acid soap, 0.002 part by weight of ferric sulfate, 0.02 part by weight of diethylenetriamine, 0.02 part by weight of p-menthane hydroperoxide, and 0.02 part by weight of tert-dodedcyl mercaptan, is then added to the mixture. The mixture is agitated for 1 to 12 hours, thereby producing an emulsion of poly (allyl chloride vinylidene chloride) copolymer. The emulsion may be used for coating and for impregnation of wood, paper, etc.

EXAMPLE XXI

About 1 part by weight of fine granular hydrated silica, 0.5 part by weight of potassium carbonate, 10 parts by weight of water, 2 parts by weight of vinyl acetate, 0.5 part by weight of acrylic acid, 2 parts by weight of allyl chloride, 0.01 parts by weight of soap, 0.01 part by weight of potassium persulfate and 0.001 part by weight of ferric sulfate are mixed then agitated at from ambient temperature to the boiling temperature of allyl chloride for 1 to 12 hours, thereby producing an emulsion of poly (allyl chloride vinyl acetate acrylic acid) copolymer.

The emulsion is diluted with 10 parts by weight of water then filtered to remove the hydrated silica. The emulsion may be used as an adhesive on wood.

EXAMPLE XXII

About 1 part by weight of the chlorinated silicon acids as produced in Example X, 1 part by weight of methallyl chloride and 3 parts by weight of vinyl acetate are mixed then agitated at ambient temperature and pressure for 1 to 12 hours, thereby producing a solid poly (methallyl chloride vinyl acetate) copolymer.

EXAMPLE XXIII

About 1 part by weight of clay with active silicic acid radicals, 2 parts by weight of allyl chloride, and 2 parts by weight vinyl acetate are mixed then agitated at ambient temperature and pressure for about 1 hour, thereby producing a mixture of poly (allyl chloride vinyl acetate) copolymer, allyl chloride and vinyl acetate. 10 parts by weight of water, 0.2 part by weight of soap, 0.01 part by weight of potassium persulfate and .001 part by weight of ferric sulfate are added to the said mixture then agitated at ambient temperature and pressure for 1 to 2 hours; then 1 part by weight of sodium hydroxide flakes are gradually added while agitating for 1 to 12 hours, thereby producing an emulsion of poly (allyl chloride allyl alcohol vinyl acetate vinyl alcohol) copolymer. The emulsion may be diluted with about 10 parts by weight of water then filtered to remove the clay. The emulsion may be used as an adhesive or protective coating on wood.

EXAMPLE XXIV

About 10 parts by weight of fine granular hydrated silica, 20 parts by weight of allyl chloride, and 20 parts by weight of isoprene are mixed then agitated at a temperature between ambient and the boiling temperature of the reactants for about 1 hour, thereby producing a mixture of poly (allyl chloride isoprene) copolymer, allyl chloride, isoprene and hydrated silica. To this mixture 0.4 parts by weight of soap, 0.06 parts by weight of lauryl mercaptan, 0.03 parts by weight of potassium chloride, 0.02 parts by weight of sodium pyrophosphate, 0.002 parts by weight of ferric sulfate, 0.04 parts by weight of hydrogen peroxide and 40 parts by weight of water are added. The mixture is agitated at ambient temperature and pressure for 1 to 12 hours, thereby producing an emulsion of poly (allyl chloride isoprene) copolymer. The copolymer may be diluted with 20 to 40 parts by weight of water then filtered to remove the hydrated silica and may be used as an adhesive on wood.

EXAMPLE XXV

About 10 parts by weight of a fine granular hydrated silica, 30 parts by weight allyl chloride and then 10 parts by weight of butadiene gas is slowly added while agitating at ambient pressure in a closed system for about 1 hour, thereby producing a mixture of poly (allyl chloride butadiene) copolymer and allyl chloride, a light gray, sticky, thick liquid.

EXAMPLE XXVI

About 10 parts by weight of a fine granular hydrated silica, 30 parts by weight of methallyl chloride and then 10 parts by weight of butadiene are slowly added at ambient temperature and pressure in a closed system while agitating for about 1 hour, thereby producing a small amount of poly (methallyl chloride butadiene) copolymer. Then 50 parts by weight of water, containing 0.5 parts by weight of soap, 0.04 parts by weight of potassium persulfate, 0.02 parts by weight of ferric sulfate are added. The mixture is then agitated for 1 to 12 hours, thereby producing a gray colored emulsion of poly (methallyl chloride butadiene) copolymer. The emulsion is filtered to remove the hydrated silica then coagulated by adding dilute sodium hydrogen sulfate to produce a soft, solid, gray copolymer.

EXAMPLE XXVII

About 10 parts by weight of fine granular hydrated silica, 10 parts by weight of allyl chloride, 0.4 parts by weight of soap, 0.03 parts by weight of potassium persulfate, 0.04 parts by weight of dodecyl mercaptan, 0.1 part by weight of phenyl beta-naphthylamine and 60 parts by weight of water are mixed; then 30 parts by weight of butadiene are added while agitating in a closed system at 40 degree to 55 degree C. and 40 to 65 psig, thereby producing a gray colored emulsion of poly (allyl chloride butadiene) copolymer.

The emulsion is coagulated by the addition of dilute sulfuric acid, then washed and filtered to recover the gray solid elastomer. The elastomer may be used to produce rubber products.

EXAMPLE XXVIII

Example XXVII is modified by adding 5 parts by weight of styrene with the allyl chloride, thereby producing a gray colored emulsion of poly (allyl chloride butadiene styrene) copolymer.

EXAMPLE XXIX

Example XXVI is modified by adding 10 parts by weight of acrylonitrile along with the butadiene, thereby producing an emulsion of poly (methallyl chloride butadiene acrylonitrile) copolymer. The emulsion is coagulated by a sodium hydrogen sulfate solution to produce a copolymer.

EXAMPLE XXX

About 10 parts by weight of fine granular hydrated silica, and 20 parts by weight allyl chloride are mixed then agitated for about 10 to 30 minutes, thereby producing a thick liquid of poly (allyl chloride) polymer; then about 2 parts by weight of sodium hydroxide in 60 parts by weight of water is added. The mixture is agitated for 10 to 30 minutes, thereby producing poly (allyl chloride allyl alcohol) copolymer. Then 0.001 parts by weight of p-menthane hydroperoxide, 0.015 parts by weight of ferrous sulfate heptahydrate, 0.02 parts by weight of sodium pyrophosphate, 0.02 parts by weight of sodium pyrophosphate, 0.02 parts by weight of tert-dodecyl mercaptan, 0.01 part by weight of diethylenetriamine and 0.5 part by weight of potassium fatty acid soap are added. To the mixture is added 40 parts by weight of butadiene, then agitated in a closed system at 5 degree to 30 degree C. for 1 to 12 hours, thereby producing a gray colored emulsion of poly (allyl chloride butadiene) copolymer.

EXAMPLE XXXI

About 1 part by weight of the mixture of dry, fine, granular, hydrated silica and chlorinated silicon acids as produced in Example X, 2 parts by weight of allyl chloride and 4 parts by weight of N-vinyl-2-pyrrolidone are mixed then agitated for 1 to 12 hours, thereby producing poly (allyl chloride N-vinyl-2-pyrrolidone) copolymer.

This copolymer may be molded into useful products such as knobs, handles, etc., by heat and pressure.

EXAMPLE XXXII

About 1 part by weight of fine, granular, hydrated silica, 3 parts by weight of methallyl chloride, 5 parts by weight of N-vinyl-2-pyrrolidone and 10 parts by weight of 3% aqueous solution of hydrogen peroxide are mixed then agitated at ambient pressure and temperature for 1 to 12 hours, thereby producing an emulsion of poly (methallyl chloride N-vinyl-2-pyrrolidone) copolymer. The water is then evaporated.

The copolymer with the hydrated silica as a filler may be molded into useful objects.

EXAMPLE XXXIII

N-vinyl carbazole may replace N-vinyl pyrrolidone in Example XXXII, thereby producing poly (methallyl N-vinyl carbazole) copolymer. The copolymer may be molded into useful objects by heat and pressure.

EXAMPLE XXXIV 2-vinyl pyridine may replace N-vinyl pyrrolidone in Example XXXII, thereby producing poly (methallyl 2-vinyl pyridine) copolymer. The copolymer may be molded into useful objects by heat and pressure.

EXAMPLE XXXV 4-vinyl pyridine may replace N-vinyl pyrrolidone in Example XXXII, thereby producing poly (methallyl 4-vinyl pyridine) copolymer. The copolymer may be molded into useful products by heat and pressure.

EXAMPLE XXXVI

About 1 part by weight of fine, granular, hydrated silica, 2 parts by weight of allyl chloride and 3 parts by weight of coal-tar light oil, containing coumarone, indene, and dicyclopentadiene, are mixed; then while agitating, about 0.1 part by weight of concentrated sulfuric acid is added at ambient temperature and pressure, thereby rapidly producing poly (allyl chloride coal-tar light oil) copolymer. The acid is neutralized with an aqueous alkali, and the copolymer may be used as a resin extender in polyurethane foams.

EXAMPLE XXXVII

About 1 part by weight of the mixture of hydrated silica and halogenated silicon acids as produced in Example IV and 3 parts by weight of allyl chloride are mixed then cooled from −40 degree to −100 degree F. with dry ice; then 1 part by weight of isobutene is slowly added while agitating for 1 to 12 hours, thereby producing poly (allyl chloride isobutene) copolymer.

EXAMPLE XXXVIII

About 1 part by weight of the mixture of hydrated silica and halogenated silicon acids as produced in Example X, 2 parts by weight of allyl chloride and 1 part by weight of isoethyl vinyl ether are mixed then agitated for 1 to 12 hours, thereby producing a solid poly (allyl chloride isoethyl vinyl ether) copolymer. The copolymer may be molded into useful products by heat and pressure and the hydrated silica and halogenated silicon acids may be used as a filler.

EXAMPLE XXXIX

About 1 part by weight of fine, granular, hydrated silica, 2 parts by weight of allyl chloride and 2 parts by weight of a mixture of alpha and beta pinenes are mixed then agitated for about 1 hour; then 0.1 part by weight of sulfuric acid is added while agiating for 1 to 12 hours, thereby producing poly (allyl chloride terpenes) copolymer. This may be used as a modifier in plastics, varnishes and paints.

EXAMPLE XXXX

About 1 part by weight of fine granular, hydrated, silica and 2 parts by weight of allyl chloride are mixed then agitated for about 1 hour, thereby producing a mixture of poly (allyl chloride) polymer and allyl chloride. About 0.1 part by weight of aluminum chloride are added and mixed thoroughly. The mixture is then cooled with dry ice to about −95 degree C., and isobutene is slowly added to the mixture while agitating until about 4 parts by weight is added, thereby producing poly (allyl chloride isobutene) copolymer.

EXAMPLE XXXXI

About 1 part by weight of the mixture of hydrated silica and halogenated silicon acids as produced in Example IV, 2 parts by weight of methallyl chloride and 3 parts by weight of isobutyl vinyl ether are mixed then agitated at ambient temperature and pressure for 1 to 12 hours, thereby producing a solid poly (methallyl chloride isobutyl vinyl ether) copolymer.

EXAMPLE XXXXII

About 1 part by weight of fine, granular, hydrated silica and 2 parts by weight of ally chloride are mixed then agitated at ambient temperature and pressure for about 1 hour, thereby producing poly (allyl chloride) polymer. Then 3 parts by weight of isobutyl vinyl ether and 0.3 part by weight of boron trifluoride are added to the poly (allyl chloride) polymer then agitated at a temperature below the boiling temperatures of the reactants for 1 to 12 hours, thereby producing a poly (allyl chloride isobutyl vinyl ether) copolymer.

EXAMPLE XXXXIII

About 10 parts by weight of fine granular hydrated silica and 20 parts by weight of allyl chloride are mixed then agitated at ambient temperature and pressure for about 1 hour thereby, producing poly (allyl chloride) polymer. The mixture is cooled to a temperature between −40 degree to −100 degree F., about 60 parts by weight of isobutylene and 100 parts by weight of an alkyl halide solvent, methyl chloride are added. Then about 0.5 part by weight of boron trifluoride are slowly added to keep the temperature between −40 degree to −100 degree F. while agitating, thereby producing poly (allyl chloride isobutylene) copolymer. The copolymer may be used as an adhesive, as a chalking agent, and in the production of rubber products.

EXAMPLE XXXXIV

About 10 parts by weight of fine, granular, hydrated silica and 20 parts by weight of methallyl chloride are mixed then agitated at ambient temperature for about 1 hour, thereby producing as mixture of poly (methyallyl chloride) polymer, methallyl chloride and hydrated silica. About 50 parts by weight of methyl chloride, containing a Friedel-Crafts catalyst, boron trifluoride, in the amount of 0.8 parts by weight, are added to said mixture and cooled to −40 degree to −100 degree F.; then this mixture is slowly added to a mixture containing about 100 parts by weight of isobutylene and 150 parts by weight of methyl chloride while agitating and keeping the temperature between −40 degree to −100 degree F., thereby producing poly (methallyl chloride isobutylene) copolymer.

The poly (allyl halide olefine) copolymers may be used as adhesives to produce rubber products such as hoses, belts, etc. and for caulking compound. The hydrated silica may be used as a filler. The solvent and unreacted methallyl chloride may be removed by washing in water; then the water is heated to boiling, thereby evaporating the solvent, methyl chloride and methallyl chloride.

EXAMPLE XXXXV

About 10 parts by weight of fine, granular, hydrated silica and 20 parts by weight of allyl chloride are mixed then agitated at ambient temperature and pressure for about 1 hour, thereby producing poly (allyl chloride) polymer. To this mixture 60 parts by weight of chloroprene, 3 parts by weight of wood rosin, 0.5 part by weight of sulfur, 0.6 part by weight of sodium hydroxide, 0.5 part by weight of sodium salt of naphthalene sulfonic acid-formaldehyde condensation 0.8 part by weight of potassium persulfate and 100 parts by weight of water are mixed then agitated at ambient temperature to just below the boiling temperature of the reactants and at ambient pressure for 1 to 12 hours, thereby producing an emulsion poly (allyl chloride chloroprene) copolymer. The copolymer is coagulated by adding a dilute acid such as acetic acid. The copolymer may be vulcanized by heat to produce synthetic elastomer products such as gloves, elastic sheets, etc.

EXAMPLE XXXXVI

About 10 parts by weight of fine, granular, hydrated silica, 30 parts by weight allyl chloride and 2 parts by weight of phosphoric acid are mixed then agitated for about 1 hour. Then propylene, at ambient to 60 psig, is bubbled through the mixture in a closed system until about 12 parts by weight are reacted, thereby producing a poly (allyl chloride propylene) copolymer. The mixture is washed with water and filtered to remove the phosphoric acid.

EXAMPLE XXXXVII

About 10 parts by weight of fine, granular, hydrated silica, 20 parts by weight of allyl chloride and 1 part by weight of sodium hydroxide are mixed then agitated at ambient temperature and pressure for about 1 hour, thereby producing poly (allyl chloride) polymer. To this mixture 60 parts by weight of water, 0.5 part by weight of soap, 0.1 part by weight of potassium persulfate and 0.0001 part by weight of ferric sulfate are admixed; then ethylene is slowly added in a closed system at ambient to 60 psig until about 10 parts by weight have been reacted, thereby producing poly (allyl chloride ethylene) copolymer.

EXAMPLE XXXXVIII

About 1 part by weight of fine, granular, hydrated silica and 2 parts by weight of allyl chloride are mixed then agitated at ambient temperature and pressure for about 1 hour, thereby producing poly (allyl chloride) polymer. The mixture is then added to and 4 parts by of a liquid unsatureated polyester polymer, containing equal mols of maleic anhydride and ethylene glycol, and is thoroughly mixed. A peroxide-type catalyst (0.01 part by weight of methyl ethyl ketone peroxide and 0.001 parts by weight of cobalt naphthate) is added to the mixture and thoroughly mixed. A hard solid resin is produced in 1 to 12 hours.

The liquid mixture may be applied to fiberglass cloth to produce strong panels, boats, containers, etc. The hydrated silica is used as a filler in the resin.

EXAMPLE XXXXIX

About 1 part by weight of fine, granular, hydrated silica and 2 parts by weight of 2-alkenyl halide, allyl chloride are mixed then agitated at ambient temperature and pressure for about 1 hour, thereby producing a liquid poly (allyl chloride) polymer. 1 to 4 parts by weight of a di-2-alkenyl maleate (diallyl maleate) are added to the mixture; then a peroxide promoter, benzoyl peroxide, in the amount of 1% to 2%, percentage based on weight of the reactants, is added and is then heated to about the boiling temperature of the reactants while agitating for 1 to 12 hours, thereby producing a thick liquid poly (allyl halide di-2-alkenyl maleate) copolymer. The copolymer may be further polymerized to a resin or may be used in the preparation of other vinyl resins. The copolymer, when polymerized to a resin, may be used as a thermosetting molding powder and used as rods, blocks and sheets.

EXAMPLE L

Example XXXXIX is modified by adding 1 to 6 parts by weight of styrene with the diallyl maleate, thereby producing poly (allyl chloride diallyl maleate styrene) copolymer. Other substituted styrene from the class of alpha-methylstyrene, p-methylstyrene, p-methoxystyrene, p-chlorostyrene, o,p-dichlorostyrene, p-trichloromethylstyrene, p-fluorostyrene, p-trifluoromethylstyrene and mixtures thereof, may be used in place of styrene.

EXAMPLE LI

Example XXXXVIII is modified by using a polyester, containing about 2 mols of diethylene glycol, 0.5 mol of phthalic anhydride and 1.5 mols of fumeric acid.

Although specific conditions and ingredients have been described in conjunction with the above Examples of preferred embodiments, these may be varied, and other reagents and additives may be used, where suitable, as described above, with similar results.

Other modifications and applications of this invention will occur to those skilled in the art upon reading this disclosure. These are intended to be included within the scope of this invention, as defined in the appended claims.

I claim:

1. The process for the production of copolymer of allyl monohalide and organic polymerizable unsaturated compounds by the following steps:
   (a) mixing a material consisting of a fine granular oxidated silicon compound wherein the oxidated silicon compound is selected from the group consisting of hydrated silica, silica, silicoformic acid, polysilicoformic acid, naturally occurring silicates with free silicic acid groups and mixtures thereof, with 1 to 3 parts by weight of an allyl mono-halide;
   (b) adding 0.10 to 5 parts by weight of an organic polymerizable unsaturated compound to each part by weight of the allylmono-halide compound;
   (c) agitating the mixture at a temperature between the temperature at which the polymerizable organic compound is in the liquid state and the lowest boiling temperature of the reactants, and at ambient to 60 psig, for 1 to 12 hours, thereby
   (d) producing a copolymer.

2. The process according to claim 1, wherein the allyl mono-halide has the general formula

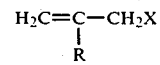

wherein R is a hydrogen or a $C_1$ to $C_4$ alkyl group and X is chlorine or bromine.

3. The process of claim 1 wherein the allyl monohalide is selected from the group consisting of allyl chloride, allyl bromide, methallyl chloride and mixtures thereof.

4. The process of claim 1, wherein an additional step is taken wherein an organic polymerizable unsaturated resin, selected from the group consisting of unsaturated polyester resins and coal tar light oil, is added in the amount of 0.10 to 5 parts by weight in step (b) of claim 1.

5. The process for the production of copolymer of allyl monohalide and organic polymerable unsaturated compounds by the following steps:

(a) mixing a material consisting of a fine granular oxidated silicon compound, wherein the oxidated silicon compound is selected from the group consisting of hydrated silica, silica, silicoformic acid, polysilicoformic acid, naturally occurring silicates with free silicic acid groups and mixtures thereof, selected from the group consisting of hydrated silica, silica, silicoformic acid, polysilicoformic acid, natural occurring silicate with free silicic acid groups and mixtures thereof, with 1 to 3 parts by weight of an allyl mono-halide;

(b) adding 0.10 to 5 parts by weight of an organic polymerable unsaturated compound, selected from the group consisting of vinyl monomers, organic diene compounds, aliphatic hydrocarbons, di-2-alkenyl maleates, diethylene glycol (bis allyl carbonate), diallyl fumarate, diallyl benzene phosphate, diallyl phthalate, triallyl cyanurate, diallyl succinate, pinenes and mixtures thereof;

(c) adding water in the amount of 10% to 200% by weight, percentage based on the weight of reactants;

(d) agitating the mixture at a temperature between the temperature at which the polymerable organic compound is in the liquid state and the lowest boiling temperature of the reactants, and at ambient to 60 psig, for 1 to 12 hours, thereby (e) producing a copolymer.

6. The process according to claim 1, wherein an acid compound, selected from the group consisting of mineral acids, sodium hydrogen salt, potassium hydrogen salt, acetic acid and mixtures thereof is added until the pH is 2 to 6 in step (a) of claim 1.

7. The process of claim 5, wherein an alkali compound, selected from the group consisting of sodium hydroxide, potassium hydroxide, sodium carbonate, potassium carbonate, calcium hydroxide, sodium polysulfides, potassium polysulfides, ammonia and mixtures thereof, is added until the pH is 7 to 12 in step (a) of claim 1, thereby producing a poly (allyl mono-halide allyl alcohol organic polymerizable unsaturated compound) copolymer in step (d) of claim 5.

8. The process of claim 1 wherein the polymerable organic unsaturated compound is selected from the group consisting of vinyl monomer, organic diene compounds, aliphatic hydrocarbons, di-2-alkenyl maleates, diethylene glycol (bis allyl carbonate), diallyl fumarate, diallyl benzene phosphate, diallyl phthalate, triallyl cyanurate, diallyl succinate, pinenes, and mixtures thereof and excluding allyl alcohol as one of the organic polymerizable unsaturated compounds to react with the allyl halide compound.

9. The process of claim 10 wherein the acrylic monomer is selected from the group of acrylic compounds, consisting of acrylic acid, hydracrylic acid, methacrylic acid, ethyl acrylic acid, crotonic acid, chloracrylic acid, fluoroacrylic acid, cyclohexyl methacrylic acid, isobutyl methacrylic acid, bromoacrylic acid, benzyl acrylic acid, methyl methacrylate, propyl acrylate, butyl acrylate, pentadecyl acrylate, hexadecyl acrylate, benzyl acrylate, cyclohexyl acrylate, phenyl ethyl acrylate, ethyl methacrylate, methyl alpha-chloroacrylate; 2-chloroethyl acrylate; 1,1-dihydroperfluorobutyl acrylate, lauryl acrylate, cyclohexyl-cyclohexyl methacrylate, allyl methacrylate; ethylene methacrylate, butyl methacrylate, polyethylene glycol dimethacrylate, tetraethylene glycol dimethacrylate and mixtures thereof.

10. The process of claim 5, wherein the vinyl monomer is selected from the group consisting of styrene, acrylic monomers, vinyl acetate, vinyl chloride, vinylidine chloride, acrylonitrile, vinyl toluenes, N-vinyl-2-pyrrolidone, N-vinyl carbazole, 2-vinyl pyridine, 4-vinyl pyridine and mixtures thereof.

11. The process of claim 5, wherein the organic diene compound is selected from the group consisting of isoprene, chloroprene, butadiene, isobutylene, butylene and other olefins, consisting of a $C_4$ to $C_7$ isoolefin and a $C_4$ to $C_{10}$ multiolefin, and mixtures thereof.

12. The process of claim 5 wherein the vinyl monomer is selected from the group consisting of alpha-methylstyrene, N-vinyl-2-pyrrolidone, vinyl alkyl ethers, allyl vinyl ethers, alicyclic ethers, aryl alkyl vinyl ethers, aryl vinyl ethers, divinyl benzenes, P-methylstyrene, p-methoxystyrene, p-chlorostyrene, o,p-dichlorostyrene, p-trichloromethylstyrenes, p-fluorostyrene, p-trifluoromethylstyrene, and mixtures thereof.

13. The process of claim 5 wherein the aliphatic compound is selected from the group consisting of ethylene, propylene and mixtures thereof and is added at ambient to 60 psig.

14. The process of claim 1, wherein an additional step is taken wherein a Friedel-Crafts catalyst, chosen from the group consisting of boron fluoride, aluminum chloride, aluminum bromide and stannic chloride, and mixtures thereof is added following step (d) of claim 1, in the amount of 1 to 25 parts per 100 parts by weight of the allyl halide.

15. The process of claim 5, wherein 1 to 2 parts by weight of an alkyl halide, selected from the group consisting of methyl chloride, ethyl chloride, methylene dichloride and mixtures thereof, containing 0.01 to 0.25 parts by weight of a Friedel-Crafts catalyst chosen from the group consisting of boron fluoride, aluminum chloride, aluminum bromide, stannic chloride and mixtures thereof are added in step (b) of claim 1.

16. The process of claim 1, wherein the oxidized silicon compound is a dry granular silicon acid, selected from the group consisting of hydrated silica, silicoformic acid, natural occuring sililic acid compounds and mixtures thereof, and is first reacted chemically with a silicon tetrahalide, silicon tetrachloride, by mixing about 1 part by weight of a dry, fine, granular silicon acid with about 1 to 2 parts by weight of a tetrahalide, silicon tetrachloride; then the mixture is agitated at ambient temperature and pressure for 1 to 4 hours, and the reaction is complete in 6 to 12 hours, thereby producing a white, fine, granular mixture of halosilicon acids; the mixture of halosilicon acids is then added in step (a) of claim 1.

17. The process of claim 5 wherein a peroxide polymerization catalyst is added in step (d) of claim 5.

18. The process of claim 1, wherein a peroxide polymerization catalyst is added in step (b) of claim 1.

19. The process of claim 5 wherein a redox polymerization system is used in step (c) of claim 5.

20. The process of claim 1, wherein a redox polymerization system is used in step (b) of claim 1.

21. The process of claim 1, wherein an alkali compound, selected from the group consisting of sodium hydroxide, potassium hydroxide, sodium carbonate, potassium carbonate, calcium hydroxide, sodium polysulfides, potassium polysulfides, ammonia and mixtures thereof, is added until the pH is 7 to 8 in step (c).

22. The process of claim 1, wherein 1 to 2 parts by weight of an alkyl halide, selected from the group consisting of methyl chloride, ethyl chloride, methylene dichloride and mixtures thereof, containing 0.01 to 0.25 parts by weight of a Friedel-Crafts catalyst chosen from the group consisting of boron fluoride, aluminum chloride, aluminum bromide, stannic chloride and mixtures thereof are added in step (b) of claim 1.

23. The process according to claim 5 wherein the allyl monohalide has the general formula

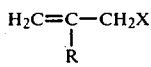

wherein R is a hydrogen or a $C_1$ to $C_4$ alkyl group and X is chlorine or bromide.

24. The process according to claim 5, wherein the allyl monohalide is selected from the group consisting of allyl chloride, allyl bromide, methallyl chloride and mixtures thereof.

25. The process of claim 8, wherein the vinyl monomer is selected from the group consisting of acrylic monomers, styrene, vinyl acetate, vinyl chloride, vinylidine chloride, acrylonitrile, vinyl toluenes, N-vinyl-2-pyrrolidone, N-vinyl carbazole, 2-vinyl pyridine, 4-vinyl pyridine and mixtures thereof.

26. The process of claim 25 wherein the acrylic monomer is selected from the group consisting of acrylic acid, hydracrylic acid, methacrylic acid, ethyl acrylic acid, crotonic acid, chloroacrylic acid, fluoroacrylic acid, cyclohexyl methacrylic acid, isobutyl methacrylic acid, bromoacrylic acid, benzyl acrylic acid, methyl methacrylate, hexadicyl acrylate, benzyl acrylate, cyclohexyl acrylate, phenyl ethyl acrylate, ethyl methacrylate, methyl alpha-chloroacrylate, 2-chloroethylacrylate, 1,1-dihydroperfluorobutyl acrylate, lauryl acrylate, cyclohexyl-cyclohexyl methacrylate, allyl methacrylate, ethylene methacrylate, butyl methacrylate, polyethylene glycol dimethacrylate, tetraethylene glycol dimethacrylate and mixture thereof.

27. The process of claim 8 wherein the organic diene compound is selected from the group consisting of isoprene, chloroprene, butadiene, isobutylene, butylene and other olefins, consisting of a $C_4$ to $C_7$, isoolefin and a $C_4$ to $C_{10}$ multiolefin, and mixtures thereof.

28. The process of claim 8 wherein the vinyl monomer is selected from group consisting of alpha-methylstyrene, N-vinyl-2-pyrrolidone, vinyl alkyl ethers, allyl vinyl ethers, alicyclic ethers, aryl alkyl vinyl ethers, aryl vinyl ethers, divinyl benzenes, p-methylstyrene, p-methoxystyrene, p-chlorostyrene, o,p-dichlorostyrene, p-trichloromethylstyrenes, p-fluorostyrene, p-trifluoromethylstyrene, and mixtures thereof.

29. The process of claim 8 wherein the aliphatic compound is selected from the group consisting of ethylene, propylene and mixtures thereof and is added at ambient to 60 psig.

* * * * *